US011451841B2

(12) United States Patent
Šopik

(10) Patent No.: US 11,451,841 B2
(45) Date of Patent: Sep. 20, 2022

(54) CONTENT FEED DELIVERY SYSTEM AND METHOD

(71) Applicant: Avast Software s.r.o., Prague (CZ)

(72) Inventor: Břetislav Šopik, Prague (CZ)

(73) Assignee: Avast Software s.r.o., Prague (CZ)

( * ) Notice: Subject to any disclaimer, the term of this patent is extended or adjusted under 35 U.S.C. 154(b) by 15 days.

(21) Appl. No.: 17/111,086

(22) Filed: Dec. 3, 2020

(65) Prior Publication Data

US 2022/0182696 A1 Jun. 9, 2022

(51) Int. Cl.
*H04N 21/24* (2011.01)
*H04N 21/258* (2011.01)
*H04L 65/612* (2022.01)

(52) U.S. Cl.
CPC ....... *H04N 21/2407* (2013.01); *H04L 65/612* (2022.05); *H04N 21/2408* (2013.01); *H04N 21/25841* (2013.01)

(58) Field of Classification Search
CPC ........... H04N 21/2407; H04N 21/2408; H04N 21/25841; H04L 65/4084
See application file for complete search history.

(56) References Cited

U.S. PATENT DOCUMENTS

| | | | | |
|---|---|---|---|---|
| 10,445,304 B1* | 10/2019 | Thompson | ............ | H04N 21/466 |
| 2002/0080169 A1* | 6/2002 | Diederiks | .......... | H04N 21/4662 |
| | | | | 715/744 |
| 2002/0116710 A1* | 8/2002 | Schaffer | ............. | H04N 21/4147 |
| | | | | 725/35 |
| 2006/0150216 A1* | 7/2006 | Herz | ..................... | H04N 21/252 |
| | | | | 348/E7.071 |
| 2012/0278725 A1* | 11/2012 | Gordon | ................ | H04N 21/858 |
| | | | | 715/738 |
| 2016/0249083 A1* | 8/2016 | Okimoto | ............ | H04N 21/2543 |
| 2019/0028748 A1* | 1/2019 | Depies | ................. | H04N 21/252 |
| 2020/0304855 A1* | 9/2020 | Gupta | .............. | H04N 21/26283 |

OTHER PUBLICATIONS

David M. Blei, Andrew Y. Ng, and Michael I. Jordan, Latent dirichlet allocation, J. Mach. Learn. Res., 3:9931022, 2003.
Wikipedia contributors, Cosine similarity, 2020. [Online; accessed Dec. 3, 2020].
Wikipedia contributors, Filter bubble, 2020. [Online; accessed Dec. 3, 2020].
Wikipedia contributors, Journalism ethics and standards, 2020. [Online; accessed Dec. 3, 2020].
Deepak Ravichandran & Sergei Vassilvitskii, Evaluation of Cohort Algorithms for the FLoC API, Oct. 22, 2020.

* cited by examiner

*Primary Examiner* — Robert J Hance
(74) *Attorney, Agent, or Firm* — Dovas Law, P.C.

(57) ABSTRACT

A method of providing a content feed. The method includes monitoring a plurality of user content streams of a plurality of users on a plurality of computing devices, the plurality of user content streams including a plurality of content instances accessible via a network. A plurality of archetypes are generated based on the plurality of user content streams. A selection of a particular archetype of the plurality of archetypes from a particular user is received on a particular computing device. A particular content stream is determined based on the particular archetype, and the particular content stream is delivered to the particular user via the particular computing device.

26 Claims, 10 Drawing Sheets

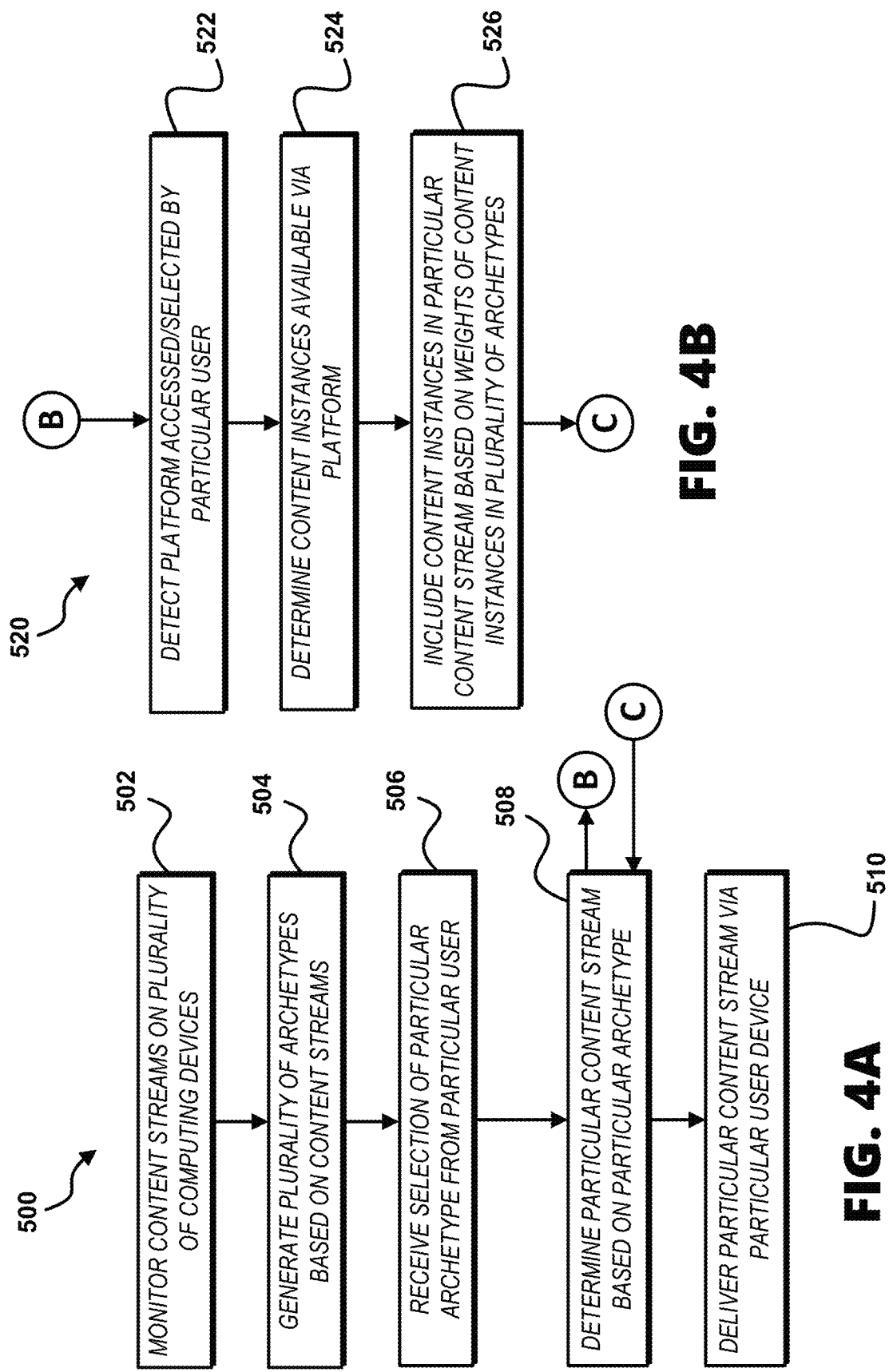

CONTENT FEED DELIVERY SYSTEM AND METHOD

FIELD OF INVENTION

The invention relates generally to data provided over a network, and more particularly to content feeds provided over a network.

BACKGROUND

Popularity of successful internet applications like YouTube™ and Twitter™ stems in part from the fact that they deliver valuable personalized content in the form of a content feed to their users. The mastering of content personalization is double edged in its impacts though, because users may be locked in isolated bubbles of their world view. As a result, vital exposure to challenging world views of other user groups may be reduced. The issue of problems caused by the limits of human subjectivity is not new and is very well known in journalism. In order to resolve this issue, journalism ethics and standards were established which bound journalists to report about stories in a way which respects different opinions so that the audience is faced with a full picture containing the challenging views. However, the content feeds of successful internet applications like YouTube™ and Twitter™—which greatly influence the world's perception of contemporary people—are generated in automated way and lack the touch of human journalists who obey a code of objectivity.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of providing a content feed is provided. The method includes monitoring a plurality of user content streams of a plurality of users on a plurality of computing devices, the plurality of user content streams including a plurality of content instances accessible via a network. A plurality of archetypes are generated based on the plurality of user content streams. A selection of a particular archetype of the plurality of archetypes from a particular user is received on a particular computing device. A particular content stream is determined based on the particular archetype, and the particular content stream is delivered to the particular user via the particular computing device.

A method is also provided including receiving a plurality of content instances from a plurality of computing devices via a network and generating a plurality of archetypes based on the plurality of content instances. An application is enabled on a particular computing device. A selection of a particular archetype of the plurality of archetypes from a particular user is received on the particular computing device via the application. A particular content instance is determined based on the particular archetype, and the particular content instance is delivered to the particular user via the particular computing device.

A system for providing content feeds is provided. The system includes a plurality of computing devices each including at least a first hardware processor and at least a first non-transitory computer-readable storage medium coupled to the at least the first hardware processor and storing first programming instructions for execution by the at least the first hardware processor, wherein the first programming instructions, when executed, cause the plurality of computing devices to perform operations including monitoring a plurality of user content streams, the plurality of user content streams including a plurality of content instances accessible via a network. The system further includes a server including at least a second hardware processor and at least a second non-transitory computer-readable storage medium coupled to the at least the second hardware processor and storing second programming instructions for execution by the at least the second hardware processor, wherein the second programming instructions, when executed, cause the server to perform operations including receiving the plurality of user content streams from the plurality of computing devices, and generating a plurality of archetypes based on the plurality of user content streams. The system further includes a particular computing device including at least a third hardware processor and at least a third non-transitory computer-readable storage medium coupled to the at least the third hardware processor and storing third programming instructions for execution by the at least the third hardware processor, wherein the third programming instructions, when executed, cause the particular computing device to perform operations including receiving the plurality of archetypes from the server, receiving a selection of a particular archetype of the plurality of archetypes from a particular user, determining a particular content stream based on the particular archetype, and delivering the particular content stream to the particular user.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

Figure 5:
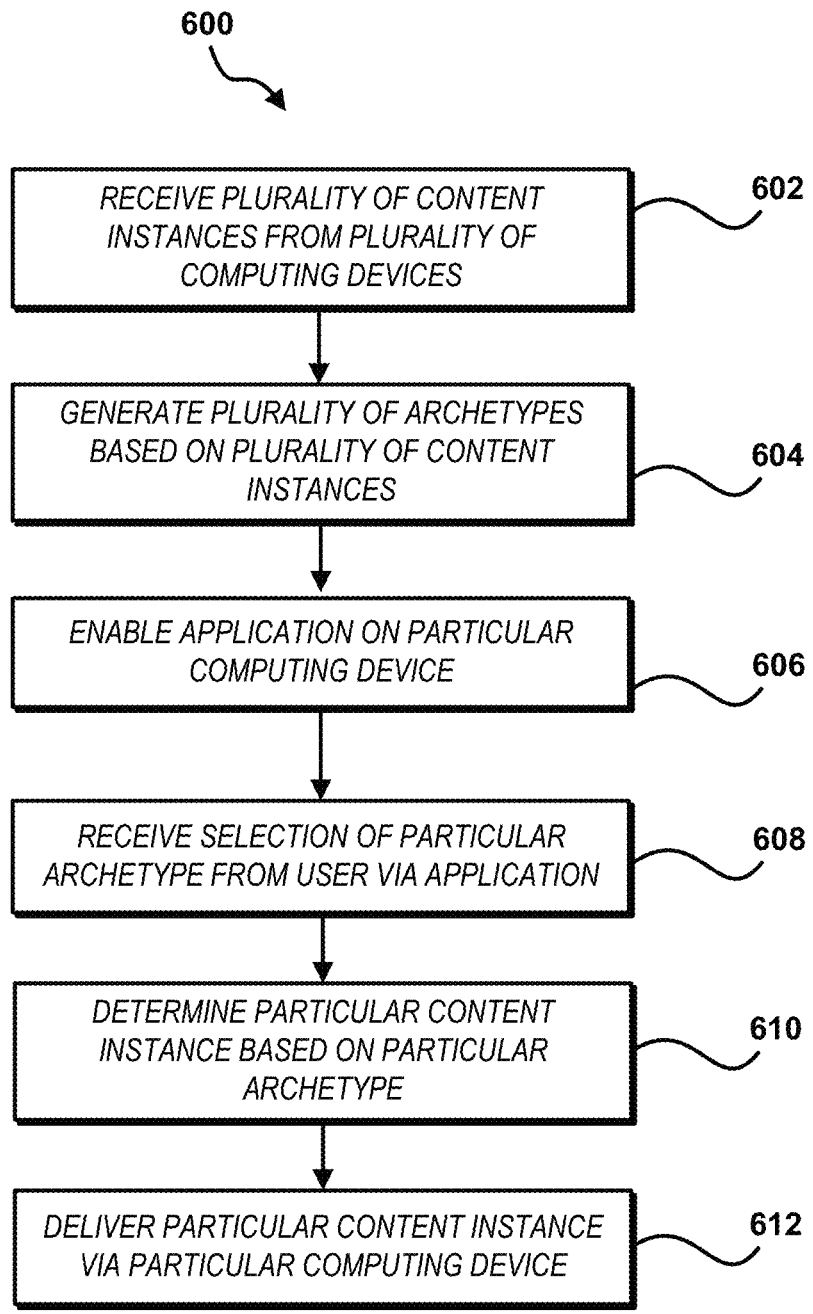

FIGS. 4A, 4B, and 5 are diagrams showing methods of providing content.

Figure 6:
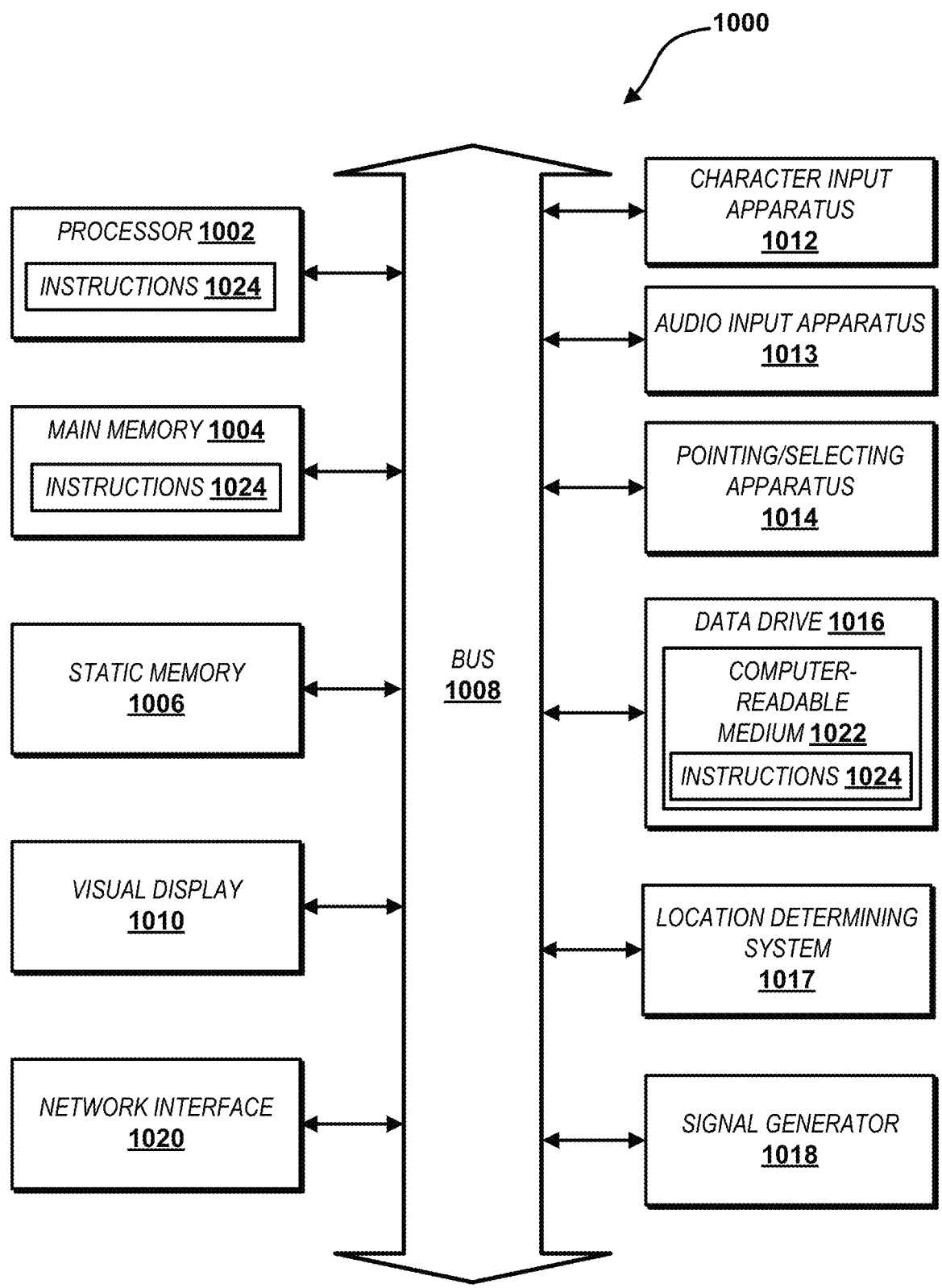

FIG. 6 shows a computer system for performing described methods according to the illustrative embodiments.

DETAILED DESCRIPTION OF ILLUSTRATIVE EMBODIMENT(S)

Figure 1:
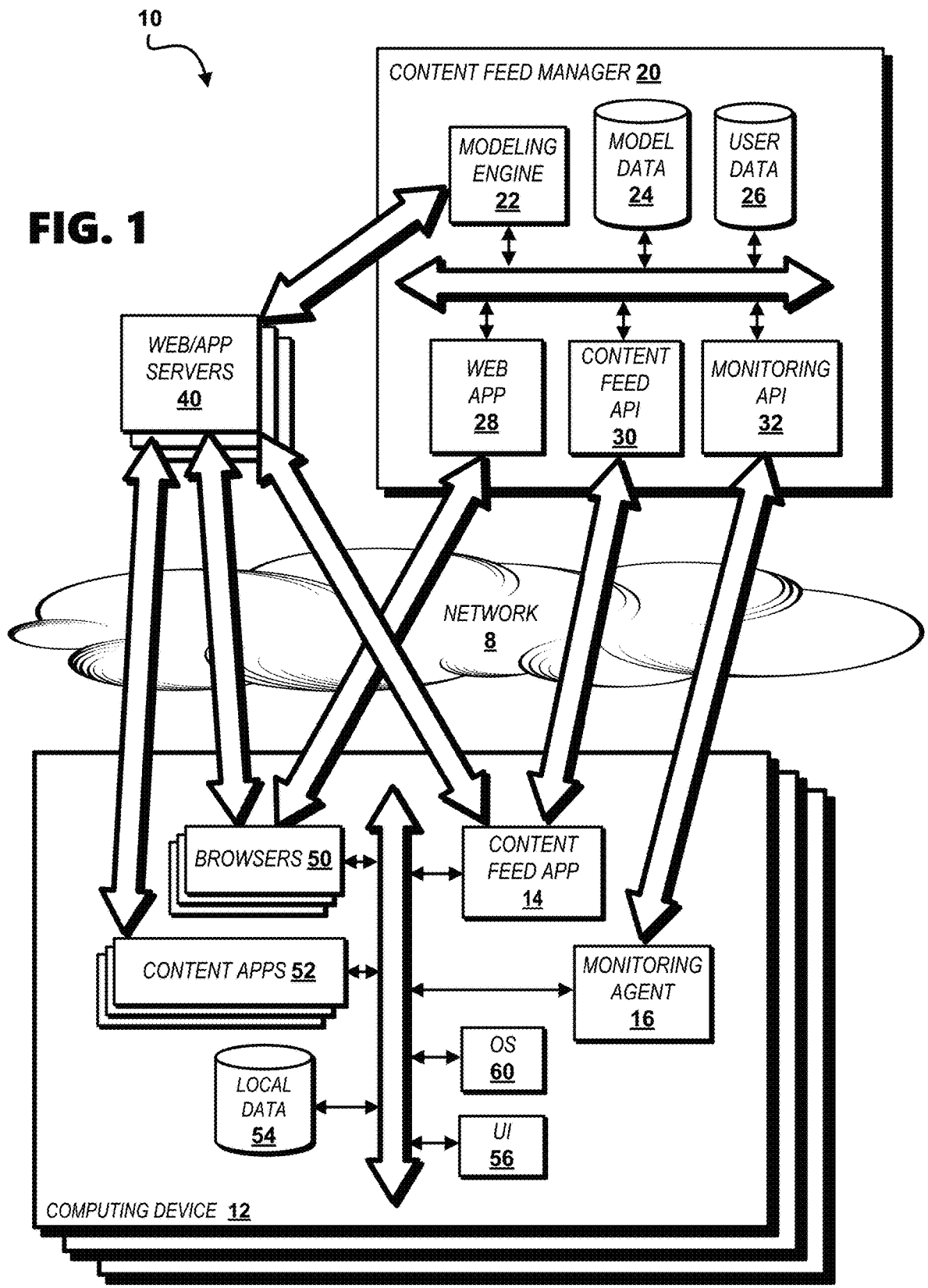
FIG. 1 shows a system for providing content feeds to a user.

Described herein are systems and methods for restoring objectivity in the realm of content-rendering platforms including personalized internet applications and websites. Referring to FIG. 1, a system 10 for providing content feeds to a user is provided. The system 10 is provided in a communications network 8 including one or more wired or wireless networks or a combination thereof, for example including a local area network (LAN), a wide area network (WAN), the internet, mobile telephone networks, and wireless data networks such as Wi-Fi™ and 3G/4G/5G cellular networks. Operating system 60 (hereinafter "OS 60") is executed on computing devices 12. The system 10 enables monitoring a plurality of user content streams of a plurality of users on a plurality of computing devices 12, the plurality of user content streams including a plurality of content instances accessible via a network. Content instances include media for example videos, social networking posts, and news articles, or portions thereof for example headings or summaries of videos, social networking posts, and news articles, or links thereto for example links to videos, social networking posts, and news articles.

The system 10 further enables generating a plurality of archetypes based on the user content streams, receiving a selection of a particular archetype of the plurality of archetypes from a particular user on a particular computing device 12, determining a particular content stream based on the particular archetype, and delivering the particular content stream to the particular user via the particular computing device 12. Beneficially, a label is applied to each of the plurality of archetypes based on content instances within each of the plurality of archetypes, for example by applying a classifier to text within content instances within each of the plurality of archetypes, and the particular user is enabled to select the particular archetype based on the label of the archetype. The particular computing device 12 is not necessarily included as one of the plurality of computing devices from which user content streams are monitored, but can be included as one of the plurality of computing devices from which user content streams are monitored.

A network-connectable processor-enabled content feed manager 20 enables content feeds to be provided to a user of a computing device 12 via a content feed application 14. The content feeds can be provided in a user interface 56 via the content feed application 14 based on data transmitted from a content feed application program interface ("API") 30 of the content feed manager 20. Alternatively, content feeds can be provided via the user interface 56 based on data transmitted from a web application 28 enabled by the content feed manager 20 and accessible via a web browser 50 executed on the computing device 12. Content feeds beneficially include links to content hosted by internet applications, websites, or other network-enabled platforms. Content feeds can alternatively include content in its entirety, abridged content, or excerpted content. Internet applications or websites providing content can include for example social media, video hosting, or news platforms, for example Youtube™, Twitter™, and Wall Street Journal™ content platforms. Applications providing content ("content applications") can include standalone applications, plugins, add-ons, or extensions to existing applications, for example web browser plugins. Content applications or components thereof can be installed and executed locally on a computing device 12 or installed and executed on remote computing systems accessible to the computing device 12 via the communications network 8, for example the internet.

A website server or application server 40 (hereinafter "web/app server") can function to enable local content applications 52 or components of a local content application 52. Web/app servers 40 can further enable services including network-based applications, webpages, or other services accessible via a web browser 50. A monitoring agent 16 monitors user activity on the computing device 12 including a user's use of local and network-based applications and a user's accessing of websites and of particular content on local and network-based applications and websites. Records and statistics of such use is used by a modeling engine 22 to build behavioral archetypes stored in a model datastore 24 of the content feed manager 20 or a local datastore 54 of the computing device 12.

A first methodology for providing content feeds includes tweaking known internet browser online tracking mechanisms in order to set an internet browser into a state which would cause a determined response from particular internet applications or websites. Internet applications and websites are individually and jointly referred to herein as "platforms". Eventually, by setting the browser into carefully chosen states a desired user experience can be brought to the user. This procedure is not ideal because the common purpose of known tracking mechanisms (e.g., browser fingerprinting, storing of browser's history, and saving of cookies) is to provide valuable information to a visited website or third-party, for example to improve a customer's user experience in e-shops, achieve better advertisement targeting, automate localization of website content, or conduct marketing studies. The purpose of tracking mechanisms is not to significantly influence the personalization of platforms. Tweaking of relevant online tracking mechanisms of a browser may result in limited or no impact in eliciting a desired response from a particular platform.

An important observation of the nature of successful contemporary platforms (e.g., internet applications and websites) is that their personalization mechanisms rely greatly on the recording of a user's interaction with the platform through the particular user's account. This observation is supported by the conclusion set forth above regarding the above-described first methodology. A second methodology provided involves elaborating on the idea of maintaining a population of artificially created user accounts initialized into well-defined states, so that their content feed would include desired properties. This second methodology is also not ideal. First, different platforms typically have different mechanisms of interaction and personalization. Accordingly, it is largely necessary to reverse engineer mechanisms for interaction and personalization separately for each platform of interest. Second, maintaining artificially created user accounts user may be against the terms and conditions of platforms of interest.

Instead of trying to create an internet experience by creating an artificial user with particular traits, a third methodology in the form of a content feed mimicking process is described herein enabling a mimicking of the content feeds of internet applications and websites, individually and jointly referred to herein as "platforms", of interest so that they represent preferences of a chosen group of users. Content feeds are enabled that mimic preferences of behavioral archetypes of internet users making it possible for a user to experience the internet through the eyes of a different chosen group of users.

Figure 2A:
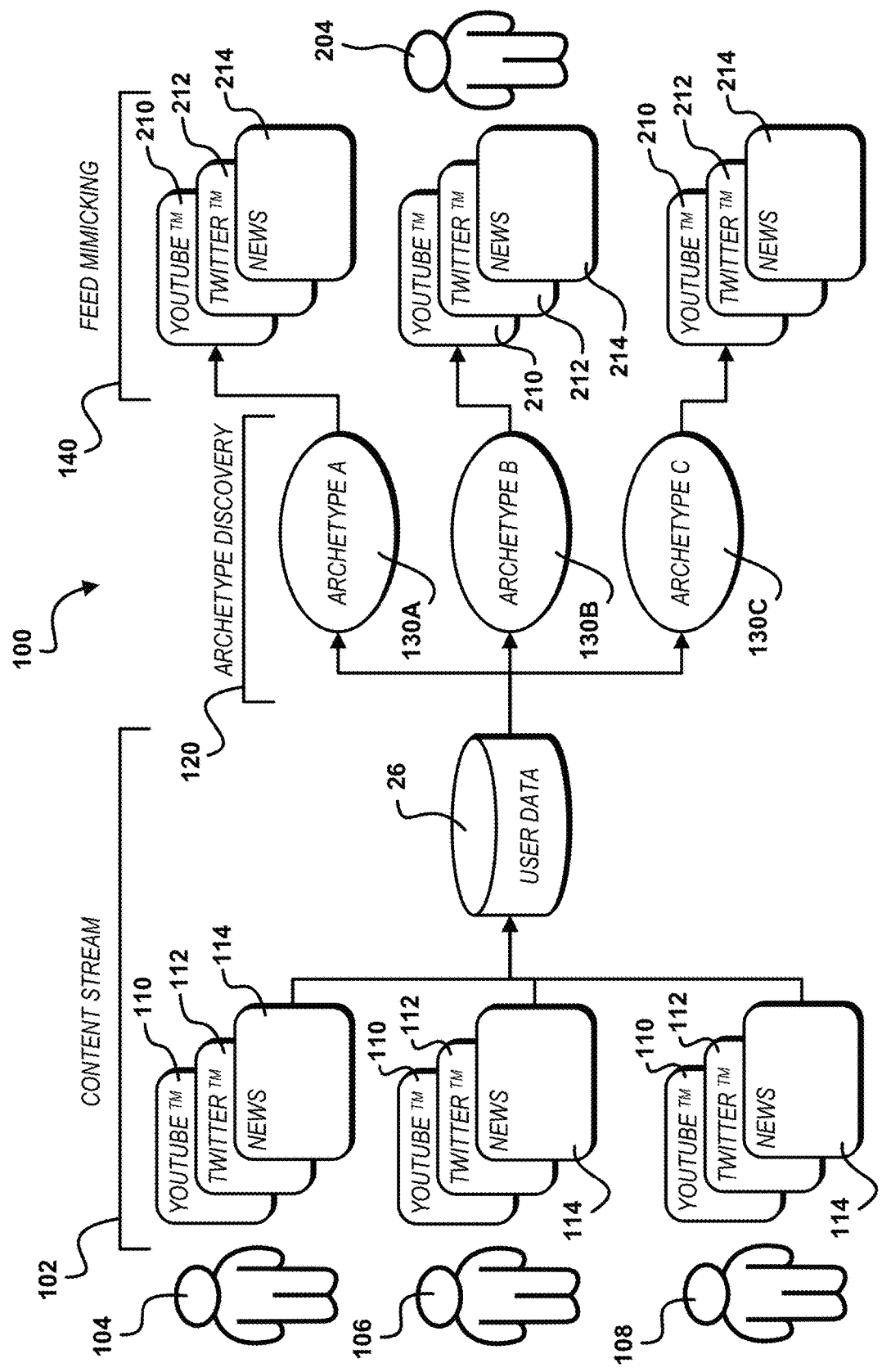
FIG. 2A is a diagram showing an exemplary pipeline of a content feed mimicking process.

Referring to FIG. 2A an exemplary pipeline 100 of a content feed mimicking process is shown. While proprietary content platforms including Youtube™ and Twitter™ are indicated in FIG. 2A, these are only exemplary and may be substituted with any number of different content platforms. In order to achieve the goal of mimicking content feeds, beneficially data from a data source is obtained including a plurality of content streams 102 including a plurality of streams of browsing activity of internet users 104, 106, 108 who gave consent to being tracked on internet applications and websites (individually and jointly referred to herein as "platforms") with publicly available content instances. One skilled in the art would understand that processes described herein are scalable to any number of users. Content instances include for example hosted user videos 110 (e.g., You- Tube™ videos), social networking posts 112 (e.g., Twitter™ Tweets™), and news media articles 114. The data from the data source can be obtained for example via a monitoring agent 16 for example in the form of a tracking browser extension installed on a computing device 12 of a user.

After gathering the plurality of content streams 102 of internet users 104, 106, 108 on websites or internet applications of interest, which data can be stored in a user datastore 26, significant groups of internet users 104, 106, 108 are discovered by an archetype discovery process 120 in which archetype "A" 130A, archetype "B" 130B, and archetype "C" 130C are determined, allowing the feeds of internet users 104, 106, 108 to be mimicked. This mimicking is beneficially performed by implementing Latent Dirichlet Allocation (hereinafter "LDA"), a powerful topical modeling algorithm from the field of natural language processing. An LDA is configured to receive documents as inputs and to output topics defined as a weighted list of words within the documents. The LDA algorithm is beneficially applied to a stream of browsing activity, for example by the modeling engine 22 based on a stream of browsing activity stored in the user datastore 26. A single user (e.g., a first user 104, a second user 106, or a third user 108) is perceived over a certain period of time (e.g., a day, week, or month) as a "document" under the LDA. A unique video, text instance (e.g., Twitter™ Tweet™), article, or other content instance accessed by the user (e.g., the first user 104, the second user 106, or the third user 108) is beneficially perceived as a "word" of the "document" under the LDA. The output of the LDA algorithm are behavioral archetypes perceived as "topics" under the LDA, which behavioral archetypes are defined as a weighted list of LDA "words" (e.g., videos, Tweets™, articles). Behavioral archetypes can be stored in a model datastore 24. Every "document" (i.e., every user) is represented as a weighted average of "topics" (i.e., behavioral archetypes). Hereinafter, LDA "topics" are referred to as significant "behavioral archetypes", the content feeds of which can be mimicked. Alternatively, other types of algorithms can be used for the discovery of behavioral archetypes. The behavioral archetypes are labeled based on content represented thereby, for example by applying a classifier to text or other data of the LDA "words" (e.g., videos, Tweets™, articles) defining the behavioral archetypes.

In a feed mimicking process 140, a content feed application 14 is provided enabling an end user 204 to choose a behavioral archetype, a plurality of behavioral archetypes, or a weighted average of behavioral archetypes for example based on a corresponding label. A content feed including publicly available content instances is created via the content feed application 14 beneficially resembling a feed of a particular internet application by selecting the most relevant elements (e.g., videos, social media posts, or articles) from source data streams of browsing activities of internet users 104, 106, 108. Content instances can include for example hosted user videos 210 (e.g., YouTube™ videos), social networking posts 212 (e.g., Twitter™ Tweets™), and news media articles 214. A very useful property of the output of the LDA is that the weights of every "word" (e.g., every video, Tweet™, or article) are distributed across the "topics" (i.e., behavioral archetypes) so that the sum of the weights is equal to 1 for each "topic" (i.e., behavioral archetype). These weights are interpreted as elements of a vector embedding of the "word" (e.g., video, Tweet™, or article) in the vector space of the "topics" (i.e., behavioral archetypes), resulting in an archetype vector of a content instance. The behavioral archetypes in this space are beneficially represented by one-hot vectors, and the content feed is created by retrieving the most similar archetype vectors of content instances to the vector of the chosen behavioral archetype, for example by utilizing the cosine similarity.

Figure 2B:
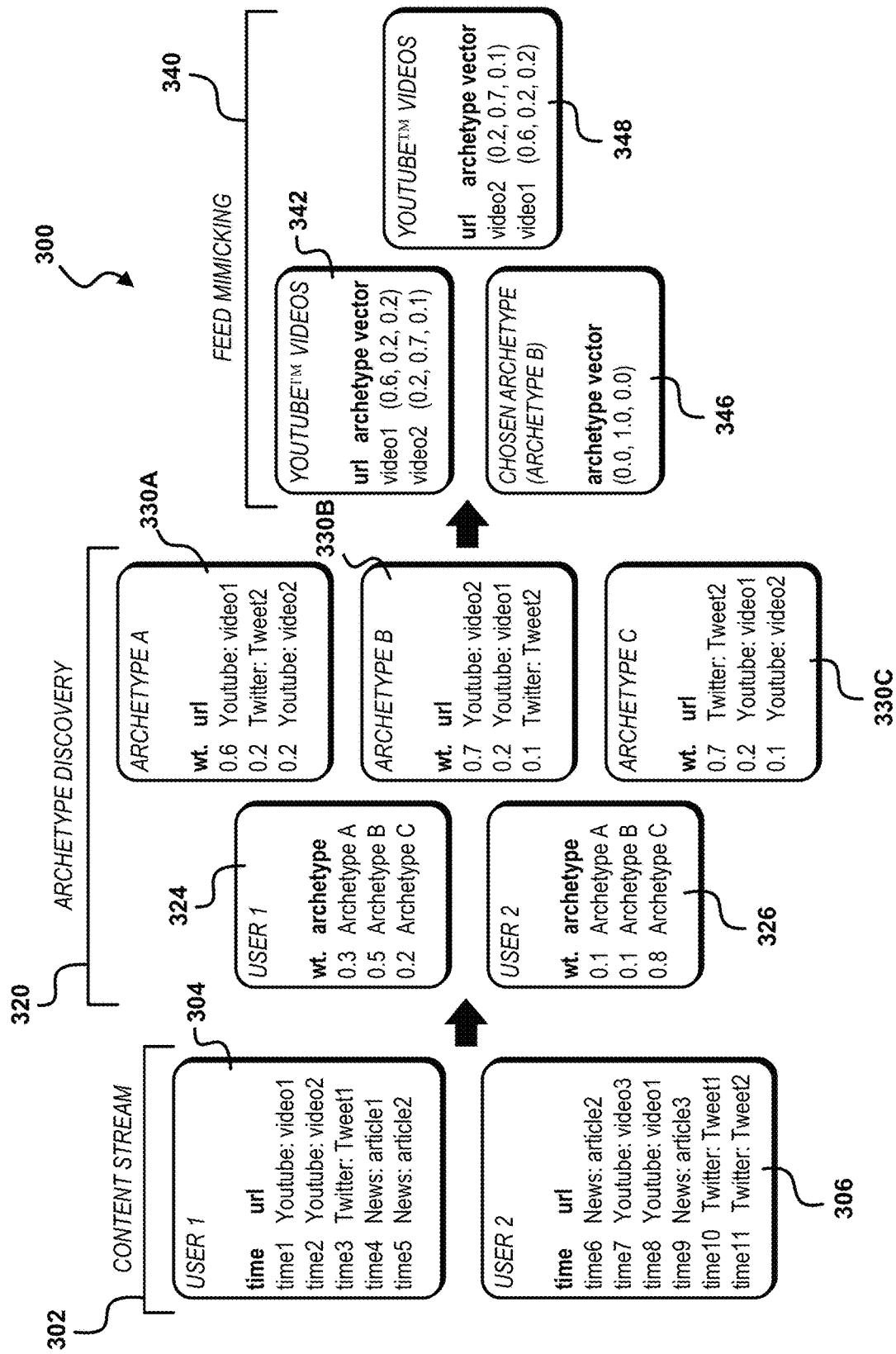
FIG. 2B is a diagram showing a process flow of an exemplary application of a content feed mimicking process in accordance with the pipeline of FIG. 2A.
Figure 3A:
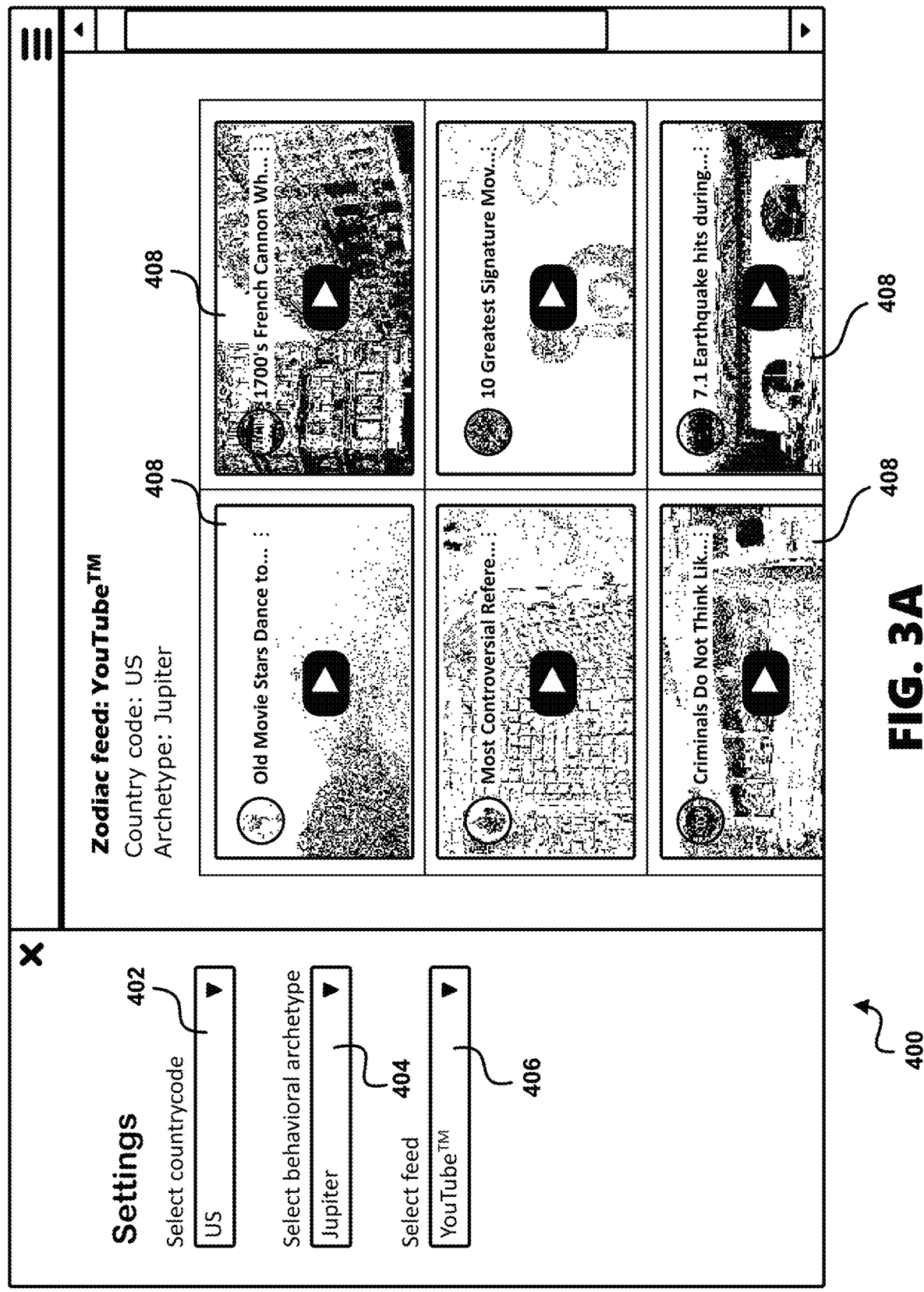
FIGS. 3A-3D show example interactive displays enabled by a content feed application to allow a user to indicate preferences and receive content.
Figure 3B:
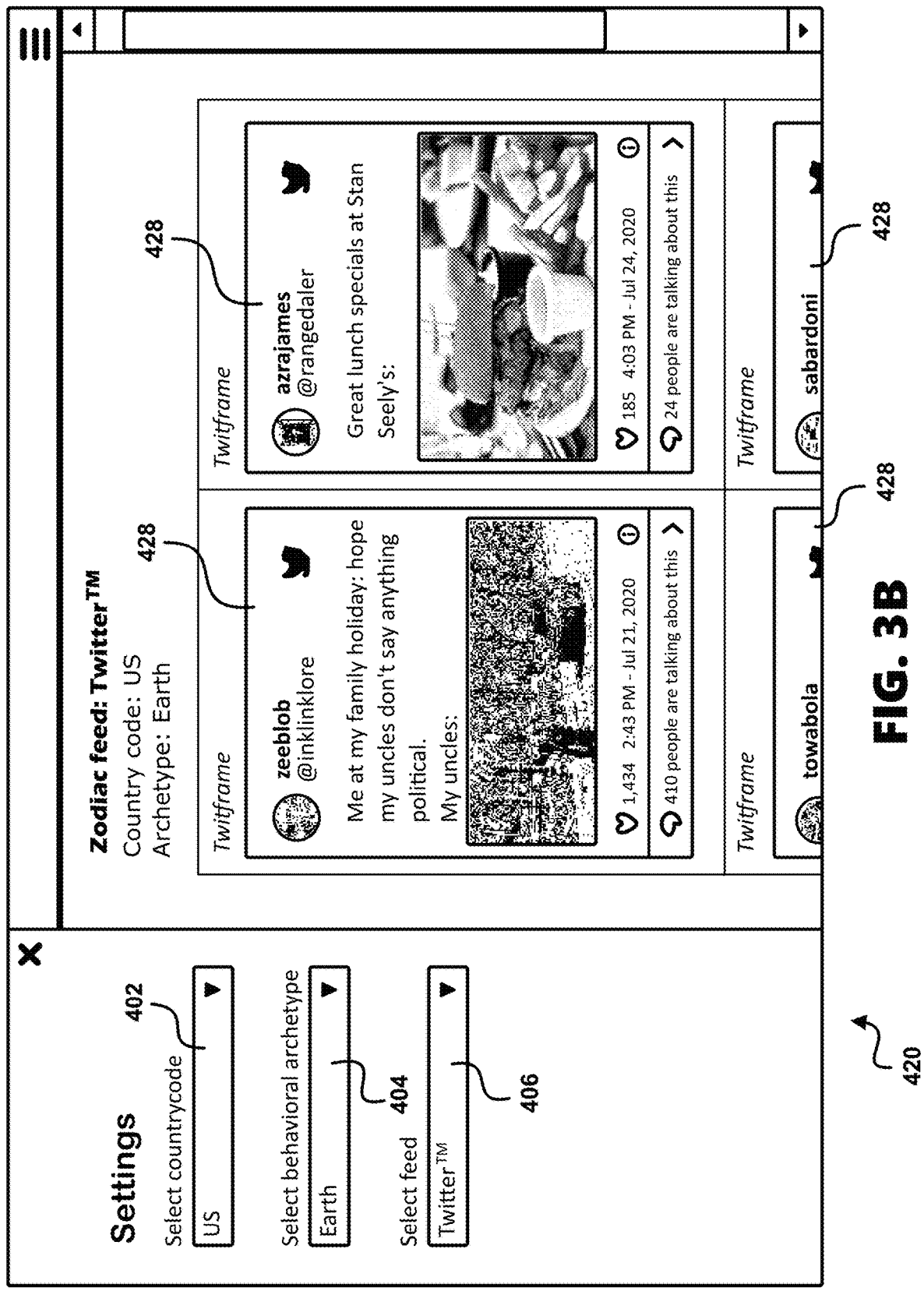
Figure 3C:
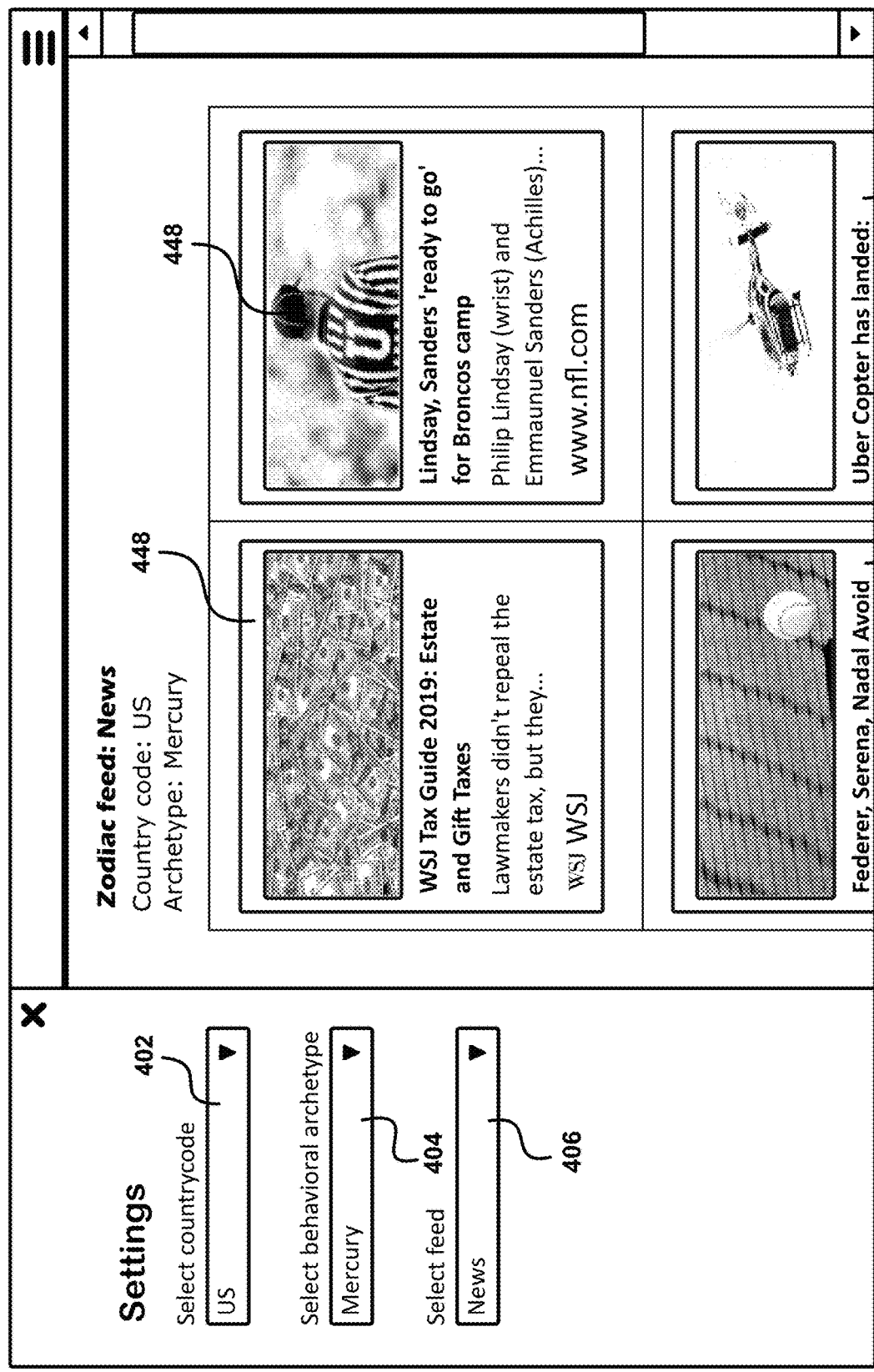
Figure 3D:
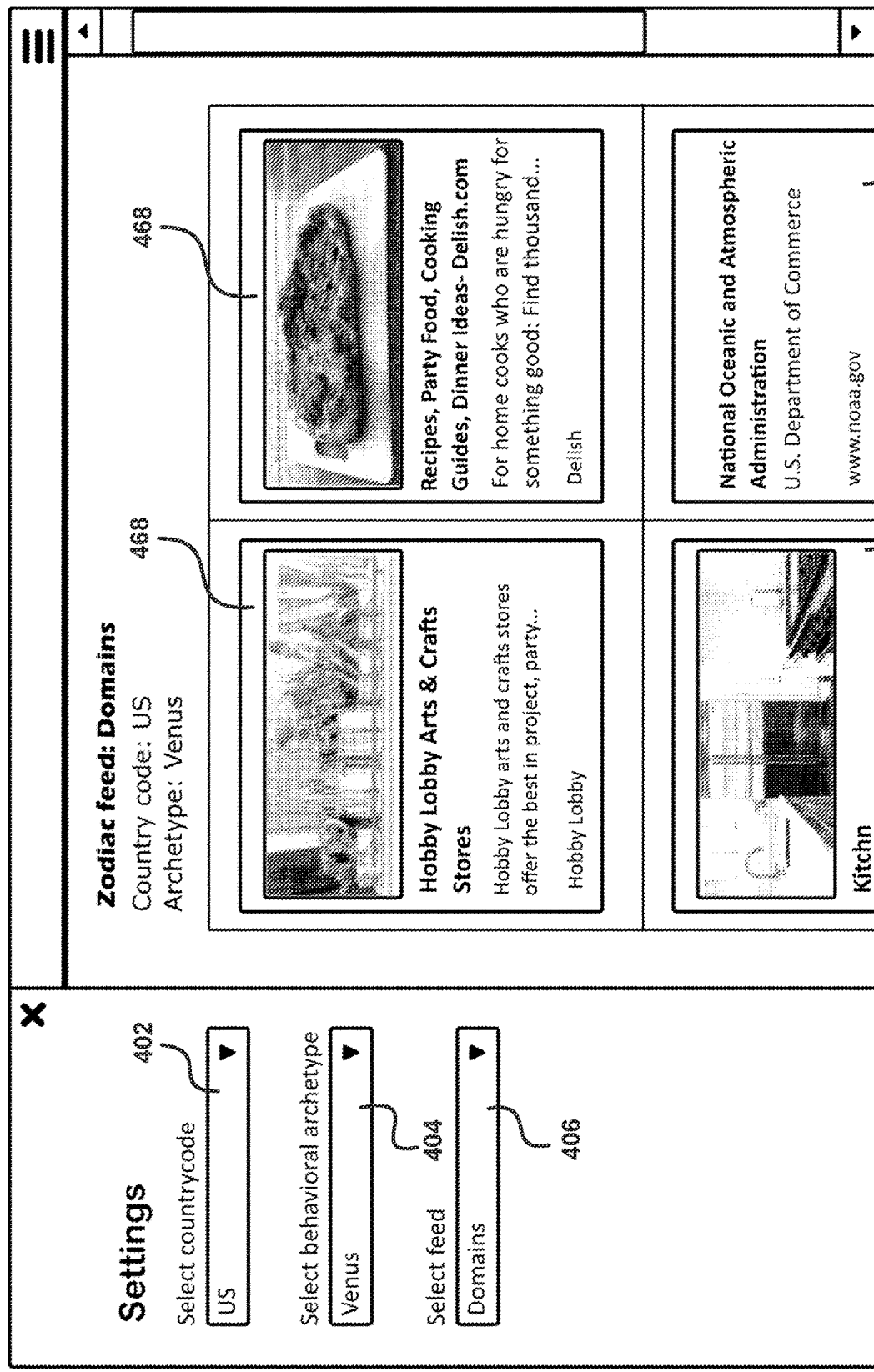

Referring to FIG. 2B a process flow 300 of an exemplary application of a content feed mimicking process in accordance with the exemplary pipeline 100 is shown. While proprietary content platforms including Youtube™ and Twitter™ are indicated in FIG. 2B, these are only exemplary and may be substituted with any number of different content platforms. A content stream 304 (e.g., a "clickstream") from the first user 104 includes a video1 from the Youtube™ platform, video2 from the Youtube™ platform, Tweet1 from the Twitter™ platform, article1 from a particular news platform, and article2 from another particular news platform respectively monitored at a corresponding time1, time2, time3, time4, and time5 as set forth in Table 1. A content stream 306 (e.g., a "clickstream") from the second user 106 includes the article2 from the other particular news platform, a video3 from the Youtube™ platform, the video1 from the Youtube™ platform, an article3 from yet another news platform, the Tweet1 from the Twitter™ platform, and a Tweet2 from the Twitter™ platform respectively monitored at time6, time7, time8, time9, time10, and time11 as set forth in Table 1.

TABLE 1

| Time | URL/Category | Content |
| --- | --- | --- |
| | User 1 | |
| 1 | Youtube ™ | video1 |
| 2 | Youtube ™ | video1 |
| 3 | Twitter ™ | Tweet1 |
| 4 | News | article1 |
| 5 | News | article2 |
| | User 2 | |
| 6 | News | article2 |
| 7 | Youtube ™ | video3 |
| 8 | Youtube ™ | video1 |
| 9 | News | article3 |
| 10 | Twitter ™ | Tweet1 |
| 11 | Twitter ™ | Tweet2 |

In an archetype discovery process 320, an LDA algorithm is applied to the content streams 304, 306 to produce an output respectively including behavioral archetype "A" 330A, behavioral archetype "B" 330B, and behavioral archetype "C" 330C with weighted content instances as set forth in Table 2. The behavioral archetype A 330A includes the video1 at weight 0.6, the Tweet2 at weight 0.2, and the video2 at weight 0.2. The behavioral archetype B 330B includes the video2 at weight 0.7, the video1 at weight 0.2, and the Tweet2 at weight 0.1. The behavioral archetype C 330C includes the Tweet2 at weight 0.7, the video1 at weight 0.2, and the video2 at weight 0.1. The behavioral archetypes are beneficially labeled based on content represented by the behavioral archetypes, for example by applying a classifier to text or other data of the video1, video2, and Tweet2. Labels can include for instance "conservative", "liberal", and "moderate" corresponding to conservative, liberal, or moderate political views.

TABLE 2

| Weight | URL/Category | Content |
|---|---|---|
| | Archetype A | |
| 0.6 | Youtube ™ | video1 |
| 0.2 | Twitter ™ | Tweet2 |
| 0.2 | Youtube ™ | video2 |
| | Archetype B | |
| 0.7 | Youtube ™ | video2 |
| 0.2 | Youtube ™ | video1 |
| 0.1 | Twitter ™ | Tweet2 |
| | Archetype C | |
| 0.7 | Twitter ™ | Tweet2 |
| 0.2 | Youtube ™ | video1 |
| 0.1 | Youtube ™ | video2 |

The LDA algorithm further produces a first representation 324 of the first user 104 including a first weighted average of behavioral archetypes and a second representation 326 of the second user 106 including a second weighted average of behavioral archetypes as shown in Table 3. The first user 104 is weighted as 0.3 (i.e., 30%) behavioral archetype A 330A, 0.5 (i.e., 50%) behavioral archetype B 330B, and 0.2 (i.e., 20%) behavioral archetype C 330C. The second user 106 is weighted as 0.1 (i.e., 10%) behavioral archetype A 330A, 0.1 (i.e., 10%) behavioral archetype B 330B, and 0.8 (i.e., 80%) behavioral archetype C 330C.

TABLE 3

| Weight | Archetype |
|---|---|
| | User 1 |
| 0.3 | Archetype A |
| 0.5 | Archetype B |
| 0.2 | Archetype C |
| | User 2 |
| 0.1 | Archetype A |
| 0.1 | Archetype B |
| 0.8 | Archetype C |

Archetype vectors are generated for content instances including for example the archetype vectors shown in a Youtube™ video archetype vector block 342 and in Table 4. For a video1 archetype vector, (0.6, 0.2, 0.2), of the Youtube™ video vector block 342, the weight of video1 in the behavioral archetype A 330A (0.6) takes a first position in the video1 archetype vector, the weight of video1 in the behavioral archetype B 330B (0.2) takes a second position in the video1 archetype vector, and the weight of video1 in the behavioral archetype C 330C (0.2) takes a third position in the video1 archetype vector. For a video2 archetype vector, (0.2, 0.7, 0.1), of the Youtube™ video vector block 342, the weight of video2 in the behavioral archetype A 330A (0.2) takes a first position in the video2 archetype vector, the weight of video2 in the behavioral archetype B 330B (0.7) takes a second position in the video2 archetype vector, and the weight of video2 in the behavioral archetype C 330C (0.1) takes a third position in the video2 archetype vector.

TABLE 4

| Content | Archetype Vector |
|---|---|
| video1 | (0.6, 0.2, 0.2) |
| video2 | (0.2, 0.7, 0.1) |

One-hot archetype vectors are generated for each generated behavioral archetype including the behavioral archetype A 330A, the behavioral archetype B 330B, and the behavioral archetype C 330C as shown in Table 5. For an archetype A vector, a first position is set to one, and second and third positions are set to zero. For an archetype B vector, a second position is set to one, and first and third positions are set to zero. For an archetype C vector, a third position is set to one, and first and second positions are set to zero.

TABLE 5

| Archetype | Archetype Vector |
|---|---|
| Archetype A | (1.0, 0.0, 0.0) |
| Archetype B | (0.0, 1.0, 0.0) |
| Archetype C | (0.0, 0.0, 1.0) |

In a content feed mimicking process 340 of the process flow 300, an end user 204 for example chooses via the content feed application 14 the behavioral archetype B 330B to be mimicked in a content feed. The behavioral archetype B 330B corresponds to the archetype B vector (0.0, 1.0, 0.0) shown in a chosen archetype block 346. The end user 204 further chooses a feed type to be the Youtube™ content platform. A first similarity between the video1 archetype vector (0.6, 0.2, 0.2) and the archetype B vector (0.0, 1.0, 0.0) is determined, beneficially by determining the cosine similarity between the video1 archetype vector (0.6, 0.2, 0.2) and the archetype B vector (0.0, 1.0, 0.0). Further, a second similarity between the video2 archetype vector (0.2, 0.7, 0.1) and the archetype B vector (0.0, 1.0, 0.0) is determined, beneficially by determining the cosine similarity between the video2 archetype vector (0.2, 0.7, 0.1) and the archetype B vector (0.0, 1.0, 0.0). A content feed 348 is provided to the end user 204 based on the determined first similarity and the determined second similarity. The content feed 348 includes both the video1 and the video2 respectively based on the determined first similarity and the determined second similarity, for example responsive to achieving threshold levels of similarity. The video2 archetype vector (0.2, 0.7, 0.1) is listed first in the content feed 348 and can be more prominently or frequently featured in the content feed 348 because the video2 archetype vector (0.2, 0.7, 0.1) is closer to the archetype B vector (0.0, 1.0, 0.0) in cosine distance than the video1 archetype vector (0.6, 0.2, 0.2) is close to the archetype B vector (0.0, 1.0, 0.0) in cosine distance.

In addition to content instances such as videos, social networking posts, and news articles, behavioral archetypes can be defined based on internet domains accessed by internet users 104, 106, 108 who gave consent to being tracked. A single user (e.g., a first user 104, a second user 106, or a third user 108) is perceived over a certain period of time (e.g., a day, week, or month) as a "document" under the LDA. A unique domain accessed by the user (e.g., the first user 104, the second user 106, or the third user 108) is beneficially perceived as a "word" of the "document" under the LDA. The output of the LDA algorithm are behavioral archetypes perceived as "topics" under the LDA, which behavioral archetypes are defined as a weighted list of LDA "words" (i.e., domains). Referring to Table 6, sample domains corresponding to sample behavioral archetypes X and W experimentally generated from user content streams of consenting users in a first exemplary geographic region (the United States) are shown, and sample domains corresponding to sample behavioral archetypes Y and Z experimentally generated from user content streams of consenting users in a second exemplary geographic region (the Czech Republic) are shown.

TABLE 6

| Region 1 | | Region 2 | |
|---|---|---|---|
| Archetype W | Archetype X | Archetype Y | Archetype Z |
| google.com | fidelity.com | google.com | seznam.cz |
| bing.com | realtor.com | facebook.com | novas.cz |
| facebook.com | ikea.com | kb.cz | meteoradar.cz |
| linkedin.com | walmart.com | mall.cz | auto.cz |
| live.com | poshmark.com | lidl.cz | onlyu.cz |
| gmail.com | kroger.com | sbazar.cz | prozeny.cz |

Referring to FIGS. 3A-3D, first, second, third, and fourth exemplary interactive displays 400, 420, 440, 460 enabled by the content feed application 14 allow a user to indicate preferences and receive content via the user interface 56 of the computing device 12. Each of the exemplary interactive displays 400, 420, 440, 460 enables selection of a country code in a first field 402, a behavioral archetype in a second field 404, and a content feed in a third field 406.

The first field 402 allows a user to select the country where content streams used for establishing the behavioral archetypes were received by computing devices 12. Selectable country codes include for example "US" for the United States, "CA" for Canada, or "CZ" for the Czech Republic. Alternatively, other geographic regions where content streams used for establishing the behavioral archetypes were received by computing devices 12 can be rendered selectable by a user, for example states, counties, cities, or groupings of countries, states, counties, or cities. The second field 404 allows a user to select a desired behavioral archetype including behavioral archetypes labeled as "Jupiter", "Earth", "Mercury", and "Venus". Alternatively, other selectable labels for behavioral archetypes can be provided, for example "conservative", "liberal", and "moderate" corresponding to politically-oriented behavioral archetypes. The third field 406 allows a user to select a content feed from selections including "YouTube™" directed at content from the YouTube™ platform, "Twitter™" directed at content from the Twitter™ platform, "News" directed at content from one or more news media platforms, and "Domains" directed at website domains. Alternatively, other platforms or content types can be provided in the third field 406.

The first exemplary interactive display 400 shows that a user has selected a "United States" country code via the first field 402, a "Jupiter" behavioral archetype via the second field 404, and a "YouTube™" content feed via the third field 406. In the first exemplary interactive display 400, the content feed application 14 delivers a particular content stream including video content instances 408 from the YouTube™ platform to the user via the user interface 56 of the computing device 12, for example by implementing the content feed mimicking process of the exemplary pipeline 100 based on content streams of internet users 104, 106, 108 located in a geographic area corresponding to the selected country code.

The second exemplary interactive display 420 shows that a user has selected the "United States" country code via the first field 402, an "Earth" behavioral archetype via the second field 404, and a "Twitter™" content feed via the third field 406. In the second exemplary interactive display 420, the content feed application 14 delivers a particular content stream including Twitter™ multimedia content instances (i.e., "Tweets™") 428 from the Twitter™ platform to the user via the user interface 56 of the computing device 12, for example by implementing the content feed mimicking process of the exemplary pipeline 100 based on content streams of internet users 104, 106, 108 located in a geographic area corresponding to the selected country code.

The third exemplary interactive display 440 shows that a user has selected the "United States" country code via the first field 402, a "Mercury" behavioral archetype via the second field 404, and a "News" content feed via the third field 406. In the third exemplary interactive display 440, the content feed application 14 delivers a particular content stream including news multimedia content instances 448 from news platforms to the user via the user interface 56 of computing device 12, for example by implementing the content feed mimicking process of the exemplary pipeline 100 based on content streams of internet users 104, 106, 108 located in a geographic area corresponding to the selected country code.

The fourth exemplary interactive display 460 shows that a user has selected the "United States" country code via the first field 402, a "Venus" behavioral archetype via the second field 404, and a "Domains" content feed via the third field 406. In the fourth exemplary interactive display 460, the content feed application 14 delivers a particular content stream including content instances 468 at a top level domain of a website to the user via the user interface 56 of computing device 12, for example by implementing the content feed mimicking process of the exemplary pipeline 100 based on content streams of internet users 104, 106, 108 located in a geographic area corresponding to the selected country code.

Referring to FIG. 4A, a method 500 of providing a content feed is shown. The method 500 is described with reference to the components of the system 10 shown in FIG. 1, including for example the computing device 12, the processor-enabled content feed manager 20, content feed application 14, monitoring agent 16, and communications network 8. Alternatively, the method 500 can be performed via other suitable systems and is not restricted to being implemented by the components of the system 10.

In a step 502, a plurality of user content streams of a plurality of users on a plurality of computing devices are monitored, the plurality of user content streams including a plurality of content instances accessible via a network. The plurality of user content streams beneficially include a plurality of network destinations. The plurality of content instances can include for example one or more of video data, photographic data, text data, news reports, or social media posts. A plurality of monitoring agents can be enabled on the plurality of computing devices, and the plurality of user content streams of the plurality of users on the plurality of computing devices can be monitored via the plurality of monitoring agents. For example, the plurality of user content streams of the plurality of users on the plurality of computing devices can be monitored via a browser extension executed on each of the plurality of computing devices.

A plurality of archetypes are generated based on the plurality of user content streams (step 504). The plurality of archetypes beneficially include a plurality of weighted lists including the plurality of content instances. A selection of a particular archetype of the plurality of archetypes from a particular user is received on a particular computing device (step 506). The particular computing device need not be one of the plurality of computing devices, but may be included as one of the plurality of computing devices. A particular content stream is determined based on the particular archetype (step 508), and the particular content stream is delivered to the particular user via the particular computing device (step 510).

Beneficially, a plurality of labels are applied to the plurality of archetypes based on the plurality of user content streams, and the selection of the particular archetype from the particular user is received as a selection of a particular label of the plurality of labels. Beneficially a label is applied to each of the plurality of archetypes based on content instances within each of the plurality of archetypes, for example by applying a classifier to text within content instances within each of the plurality of archetypes. A plurality of labels of the plurality of archetypes are determined based on the plurality of weighted lists comprising the plurality of content instances. Particularly, each of the plurality of labels of the plurality of archetypes are determined based on a corresponding one of the plurality of weighted lists. The particular user is enabled to select the particular archetype based on the label of the archetype.

In an extension to the method 500, a selection of a particular feed type from the particular user is received on the particular computing device, and the particular content stream is determined further based on the particular feed type. The particular feed type can include for example a particular content platform (e.g., YouTube™ or Twitter™), a particular content type (e.g., news), or a particular network destination type (e.g., a top level domain). Further, a plurality of geographic locations of the plurality of computing devices can be determined, and the plurality of geographic locations can be respectively associated with the plurality of archetypes. A selection of a particular geographic region from the particular user can be received on the particular computing device, and the particular content stream can be determined further based on the particular geographic region.

In the method 500, the plurality of archetypes are beneficially generated by applying a latent dirichlet allocation ("LDA") algorithm to the plurality of user content streams. The generated plurality of archetypes can include a plurality of weighted lists including the plurality of content instances. Beneficially, a first vector is generated representing the selected particular archetype based on the plurality of archetypes. A platform accessed by the particular user via the network is detected. Alternatively, a platform is selected by the particular user, or alternatively, a platform is otherwise identified. One or more particular content instances of the plurality of content instances available via the platform are determined, the plurality of weighted lists including weights of the one or more particular content instances in the plurality of archetypes. A second vector is generated based on the weights of the one or more particular content instances in the plurality of archetypes. A similarity of the first vector and the second vector is determined for example by determining a cosine similarity of the first vector and the second vector, and it is determined to include the one or more particular content instances in the particular content stream based on the determined similarity of the first vector and the second vector. Beneficially, the first vector includes a first plurality of variables of a quantity equal to a number of the plurality of archetypes, wherein the first plurality of variables include a certain variable corresponding to the particular archetype and other variables corresponding to other archetypes of the plurality archetypes, and wherein the certain variable is equal to one (1) and the other variables are equal to zero (0); and the second vector includes a second plurality of variables of the quantity equal to the number of the plurality of archetypes, wherein each of the second plurality of variables corresponds to a particular weight of the one or more particular content instance at a respective one of the plurality of archetypes, and wherein the sum of the second plurality of variables is equal to one (1).

Referring to FIG. 4B, a further extension 520 to the method 500 is beneficially implemented in determining the particular content stream in step 508. In the further extension 520 starting at B and ending at C, a platform accessed or selected by the particular user via the network is detected (step 522). One or more particular content instances of the plurality of content instances available via the platform are determined (step 524). The plurality of archetypes include a plurality of weighted lists including the plurality of content instances, the plurality of weighted lists including weights of the one or more particular content instances in the plurality of archetypes. The one or more particular content instances are included in the particular content stream based on weights of the one or more particular content instances in the plurality of archetypes (step 526).

Referring to FIG. 5, a method 600 of providing a content feed is shown. The method 600 is described with reference to the components of the system 10 shown in FIG. 1, including for example the computing device 12, the processor-enabled content feed manager 20, content feed application 14, monitoring agent 16, and communications network 8. Alternatively, the method 600 can be performed via other suitable systems and is not restricted to being implemented by the components of the system 10.

The method 600 includes receiving a plurality of content instances from a plurality of computing devices via a network (step 602), and generating a plurality of archetypes based on the plurality of content instances (step 604). An application is enabled on a particular computing device (step 606), and a selection of a particular archetype of the plurality of archetypes from a particular user is received on the particular computing device via the application (step 608). A particular content instance is determined based on the particular archetype (step 610), and the particular content instance is delivered to the particular user via the particular computing device (step 612). The particular content instance is beneficially one of the plurality of content instances.

In an extension to the method 600, a plurality of geographic locations of the plurality of computing devices are determined, the plurality of geographic locations are respectively associated with the plurality of archetypes, a selection of a particular geographic region from the particular user is received on the particular computing device via the application, and the particular content instance is determined further based on the particular geographic region. In a further extension to the method 600, a selection of a particular feed type from the particular user is received on the particular computing device via the application, and the particular content instance is determined further based on the particular feed type.

The herein described illustrative embodiments provide solutions to the problem of the lack of objectivity in personalized feeds in contemporary internet applications. Contemporary internet applications can be characterized by the following practical observations. The applications are mostly insensitive to tweaking of the browser properties which are known to be the subject of the tracking mechanisms; major components of the personalization in contemporary internet applications come from the recording of the user's interaction with the application via the user's account; and personalization mechanisms are specific to each internet application, and their reverse engineering is tedious and commonly against terms and conditions of the application. The herein described illustrative embodiments address changes stemming from these observations.

The illustrative embodiments enable mimicking a feed of a chosen application (e.g., Twitter™), where the feed includes public content preferred by users representing a particular behavioral archetype. A beneficial component of the described systems and methods is a tracking application for example in the form of a browser extension which records the browsing behavior of users in particular internet applications. The illustrative embodiments provide a user a unique opportunity to experience the particular internet applications through the eyes of a characteristic user group.

FIG. 6 illustrates in abstract the function of an exemplary computer system 1000 on which the systems, methods and processes described herein can execute. For example, the computing device 12, content feed manager 20, and the web/app servers 40 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method of providing a content feed comprising:
monitoring a plurality of user content streams of a plurality of users on a plurality of computing devices, the plurality of user content streams comprising a plurality of content instances accessible via a network;
generating a plurality of archetypes based on the plurality of user content streams, wherein the plurality of archetypes comprise a plurality of weighted lists comprising the plurality of content instances;
receiving a selection of a particular archetype of the plurality of archetypes from a particular user on a particular computing device;
generating a first vector representing the particular archetype based on the plurality of archetypes;
determining at least one particular content instance of the plurality of content instances available via a platform, the plurality of weighted lists comprising weights of the at least one particular content instance in the plurality of archetypes;
generating a second vector based on the weights of the at least one particular content instance in the plurality of archetypes;
determining a similarity of the first vector and the second vector;
determining a particular content stream including the at least one particular content instance based on the determined similarity of the first vector and the second vector; and
delivering the particular content stream to the particular user via the particular computing device.

2. The method of claim 1, the method further comprising detecting the platform based on an access by the particular user to the platform via the network.

3. The method of claim 1, the method further comprising detecting the platform based on a selection by the particular user of the platform via the network.

4. The method of claim 1, further comprising applying a latent dirichlet allocation ("LDA") algorithm to the plurality of user content streams to generate the plurality of archetypes.

5. The method of claim 1, wherein:
the first vector comprises a first plurality of variables of a quantity equal to a number of the plurality of archetypes, wherein the first plurality of variables comprise a certain variable corresponding to the particular archetype and other variables corresponding to other archetypes of the plurality of archetypes, and wherein the certain variable is equal to one (1) and the other variables are equal to zero (0); and
the second vector comprises a second plurality of variables of the quantity equal to the number of the plurality of archetypes, wherein each of the second plurality of variables corresponds to a particular weight of the at least one particular content instance at a respective one of the plurality of archetypes, and wherein the sum of the second plurality of variables is equal to one (1).

6. The method of claim 1, further comprising:
determining a plurality of labels of the plurality of archetypes based on the plurality of weighted lists comprising the plurality of content instances; and
receiving the selection of the particular archetype from the particular user as a selection of a particular label of the plurality of labels.

7. The method of claim 1, the plurality of content instances comprising at least one of video data, photographic data, or text data.

8. The method of claim 1, the plurality of content instances comprising at least one of news reports or social media posts.

9. The method of claim 1, further comprising monitoring the plurality of user content streams of the plurality of users on the plurality of computing devices via a browser extension executed on each of the plurality of computing devices.

10. The method of claim 1, further comprising:
enabling a plurality of monitoring agents on the plurality of computing devices; and
monitoring the plurality of user content streams of the plurality of users on the plurality of computing devices via the plurality of monitoring agents.

11. The method of claim 1, wherein the plurality of user content streams comprise a plurality of network destinations.

12. The method of claim 1, further comprising:
receiving a selection of a particular feed type from the particular user on the particular computing device; and
determining the particular content stream further based on the particular feed type.

13. The method of claim 12, wherein the particular feed type comprises a particular content platform.

14. The method of claim 1, further comprising:
determining a plurality of geographic locations of the plurality of computing devices; and
associating the plurality of geographic locations respectively with the plurality of archetypes.

15. The method of claim 14, further comprising:
receiving a selection of a particular geographic region from the particular user on the particular computing device; and
determining the particular content stream further based on the particular geographic region.

16. The method of claim 1, further comprising:
applying a plurality of labels to the plurality of archetypes based on the plurality of user content streams; and
receiving the selection of the particular archetype from the particular user as a selection of a particular label of the plurality of labels.

17. A method of providing a content feed comprising:
monitoring a plurality of user content streams of a plurality of users on a plurality of computing devices, the plurality of user content streams comprising a plurality of content instances accessible via a network;
generating a plurality of archetypes based on the plurality of user content streams, wherein the plurality of archetypes comprise a plurality of weighted lists comprising the plurality of content instances;
receiving a selection of a particular archetype of the plurality of archetypes from a particular user on a particular computing device;
generating a first vector representing the particular archetype based on the plurality of archetypes;

receiving a selection from the particular user of a platform;
determining at least one particular content instance of the plurality of content instances available via the platform, the plurality of weighted lists comprising weights of the at least one particular content instance in the plurality of archetypes;
generating a second vector based on the weights of the at least one particular content instance in the plurality of archetypes;
determining a similarity of the first vector and the second vector; and
determining a particular content stream including the at least one particular content instance based on the determined similarity of the first vector and the second vector; and
delivering the particular content stream to the particular user via the particular computing device.

18. The method of claim 17, the method further comprising applying an LDA algorithm to the plurality of user content streams to generate the plurality of archetypes.

19. A method of providing a content feed comprising:
monitoring a plurality of user content streams of a plurality of users on a plurality of computing devices, the plurality of user content streams comprising a plurality of content instances accessible via a network;
generating a plurality of archetypes based on the plurality of user content streams, wherein the plurality of archetypes comprise a plurality of weighted lists comprising the plurality of content instances;
receiving a selection of a particular archetype of the plurality of archetypes from a particular user on a particular computing device;
generating a first vector representing the particular archetype based on the plurality of archetypes;
detecting a platform accessed by the particular user via the network;
determining at least one particular content instance of the plurality of content instances available via the platform, the plurality of weighted lists comprising weights of the at least one particular content instance in the plurality of archetypes;
generating a second vector based on the weights of the at least one particular content instance in the plurality of archetypes;
determining a similarity of the first vector and the second vector; and
determining a particular content stream including the at least one particular content instance based on the determined similarity of the first vector and the second vector; and
delivering the particular content stream to the particular user via the particular computing device.

20. The method of claim 19, wherein determining the similarity of the first vector and the second vector comprises determining a cosine similarity of the first vector and the second vector.

21. The method of claim 19, wherein:
the first vector comprises a first plurality of variables of a quantity equal to a number of the plurality of archetypes, wherein the first plurality of variables comprise a certain variable corresponding to the particular archetype and other variables corresponding to other archetypes of the plurality of archetypes, and wherein the certain variable is equal to one (1) and the other variables are equal to zero (0); and
the second vector comprises a second plurality of variables of the quantity equal to the number of the plurality of archetypes, wherein each of the second plurality of variables corresponds to a particular weight of the at least one particular content instance at a respective one of the plurality of archetypes, and wherein the sum of the second plurality of variables is equal to one (1).

22. The method of claim 21, wherein determining the similarity of the first vector and the second vector comprises determining a cosine similarity of the first vector and the second vector.

23. A method comprising:
receiving a plurality of content instances from a plurality of computing devices via a network;
generating a plurality of archetypes based on the plurality of content instances, wherein the plurality of archetypes comprise a plurality of weighted lists comprising the plurality of content instances;
enabling an application on a particular computing device;
receiving a selection of a particular archetype of the plurality of archetypes from a particular user on the particular computing device via the application;
generating a first vector representing the particular archetype based on the plurality of archetypes;
determining at least one particular content instance of the plurality of content instances available via a platform, the plurality of weighted lists comprising weights of the at least one particular content instance in the plurality of archetypes;
generating a second vector based on the weights of the at least one particular content instance in the plurality of archetypes;
determining a similarity of the first vector and the second vector;
determining a particular content instance based on the determined similarity of the first vector and the second vector; and
delivering the particular content instance to the particular user via the particular computing device.

24. The method of claim 23, further comprising:
determining a plurality of geographic locations of the plurality of computing devices;
associating the plurality of geographic locations respectively with the plurality of archetypes;
receiving a selection of a particular geographic region from the particular user on the particular computing device via the application; and
determining the particular content instance further based on the particular geographic region.

25. The method of claim 24, further comprising:
receiving a selection of a particular feed type from the particular user on the particular computing device via the application; and
determining the particular content instance further based on the particular feed type.

26. A system for providing content feeds comprising:
a plurality of computing devices each comprising at least a first hardware processor and at least a first non-transitory computer-readable storage medium coupled to the at least the first hardware processor and storing first programming instructions for execution by the at least the first hardware processor, wherein the first programming instructions, when executed, cause the plurality of computing devices to perform operations comprising monitoring a plurality of user content streams, the plurality of user content streams comprising a plurality of content instances accessible via a network;

a server comprising at least a second hardware processor and at least a second non-transitory computer-readable storage medium coupled to the at least the second hardware processor and storing second programming instructions for execution by the at least the second hardware processor, wherein the second programming instructions, when executed, cause the server to perform operations comprising:

receiving the plurality of user content streams from the plurality of computing devices; and generating a plurality of archetypes based on the plurality of user content streams, wherein the plurality of archetypes comprise a plurality of weighted lists comprising the plurality of content instances; and a particular computing device comprising at least a third hardware processor and at least a third non-transitory computer-readable storage medium coupled to the at least the third hardware processor and storing third programming instructions for execution by the at least the third hardware processor, wherein the third programming instructions, when executed, cause the particular computing device to perform operations comprising:

receiving the plurality of archetypes from the server;

receiving a selection of a particular archetype of the plurality of archetypes from a particular user;

generating a first vector representing the particular archetype based on the plurality of archetypes;

determining at least one particular content instance of the plurality of content instances available via a platform, the plurality of weighted lists comprising weights of the at least one particular content instance in the plurality of archetypes;

generating a second vector based on the weights of the at least one particular content instance in the plurality of archetypes;

determining a similarity of the first vector and the second vector;

determining a particular content stream including the at least one particular content instance based on the determined similarity of the first vector and the second vector; and delivering the particular content stream to the particular user.

* * * * *